3,397,770
DISPENSING CONTAINER
Charles S. Howard, 976 W. 9th St., Upland, Calif.
91786, and Gerald A. Rudolph, Covina, Calif.
(3521 W. Beverly Blvd., Montebello, Calif. 90640)
Filed Aug. 28, 1967, Ser. No. 663,722
5 Claims. (Cl. 206—42)

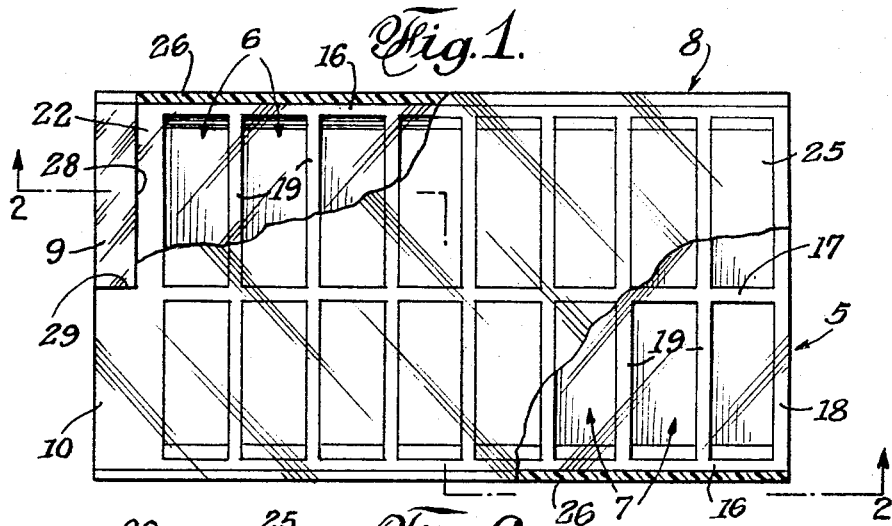
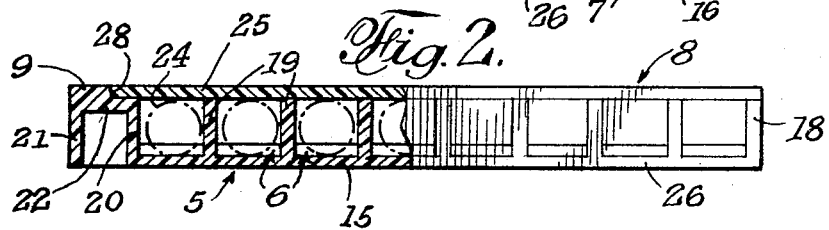
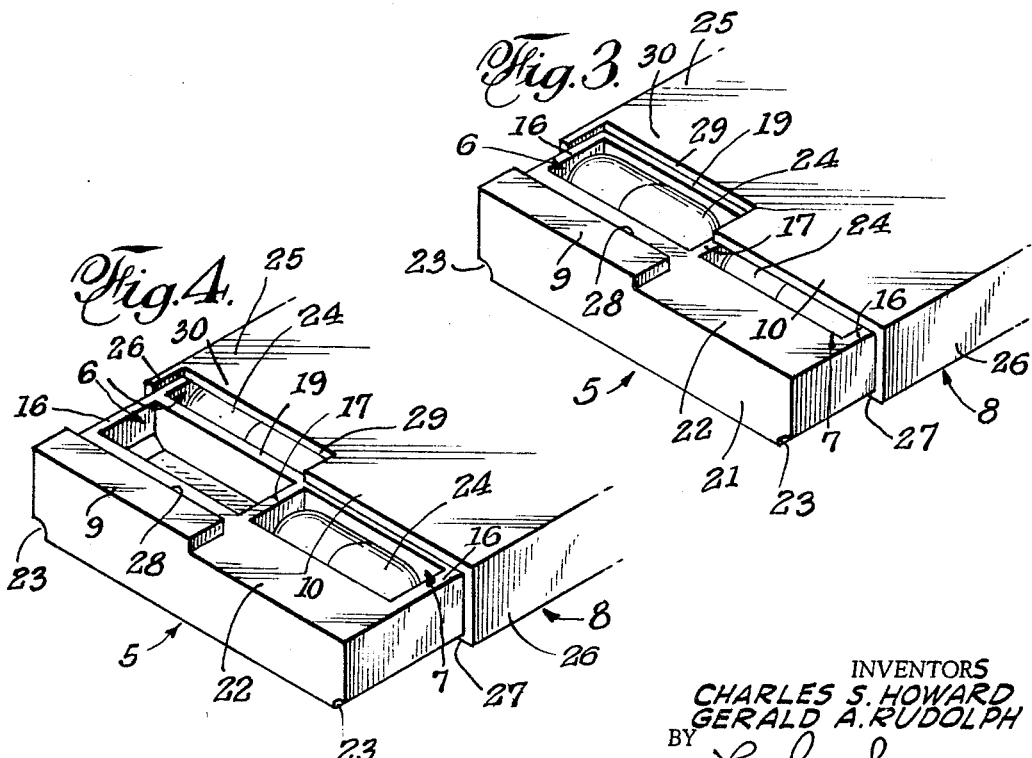
INVENTORS
CHARLES S. HOWARD
GERALD A. RUDOLPH
BY C. G. Stratton
ATTORNEY

ABSTRACT OF THE DISCLOSURE

A rectangular receptacle provided with two rows of article-holding cavities that are transversely aligned, one end of the receptacle being provided with an abutment at the end of one row of cavities; and a cover slidingly engaged with the receptacle to cover the cavities to keep the articles therein in place, one end of the cover having a notch therein in operative association with said abutment, thereby defining an extension on the cover that is aligned with the other row of cavities. When the cover is slid back so the notch therein fully exposes the first cavity of the row aligned therewith, so that an article in said exposed cavity may be dispensed by inverting the container, the cover extension still partly covers the cavity in the second row which is transversely aligned with the exposed cavity, thereby preventing dispensing of the article therein. In this manner, the articles may be alternately dispensed, one or more at a time, alternately, as the cover is retracted.

BACKGROUND OF THE INVENTION

Best exemplified by Patent No. 3,033,355, dated May 8, 1962. This patent discloses two rows of cavities in the receptacle that are staggered or offset, the operatively associated cavities being alternately exposed by a straight, continuous, transverse end edge of a slidable cover for said cavities. This patent also discloses specially designed detent and frangible lug means to releasably lock the cover to the receptacle.

The following patents were cited in the prosecution of the above patent: 828,151, 2,411,471, 2,777,570, 2,917,-162, 2,984,382.

A search turned up the following U.S. Patents: 2,063,-556, 2,164,832, 2,172,547, 2,324,228, 2,353,819, 2,708,-026, 3,143,207, 3,199,489, 3,262,747.

The features deemed novel, as generally exemplified in the abstract, above, are deemed not to be present in any of the above-listed patents.

SUMMARY OF THE INVENTION

The dispensing container disclosed herein comprises, generally, a receptacle 5 that is provided with two longitudinal rows of cavities 6 and 7 for holding articles such as pills, capsules, etc., the cavities of one row being transversely aligned with the cavities of the other row; a cover 8 having sliding engagement with the receptacle and engaged therewith to slide longitudinally so that an end of the cover exposes the cavities successively as the cover is manually slid in a step-by-step manner; an abutment 9 on an end of the receptacle to constitute a stop to engage said end of the cover to locate the same in cavity-covering position; and an extension 10 on said cover end cooperating with the end of the cover that abuts the abutment to expose the cavities of one row 7 alternately partly and fully, and the cavities of the other row 6 alternately fully and partly, as the cover is slid in said step-by-step manner.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description, which is based on the accompanying drawing. However, said drawing merely shows, and the following description merely describes, one embodiment of the present invention, which is given by way of illustration or example only.

In the drawing, like reference characters designate similar parts in the several views.

BRIEF DESCRIPTION OF THE DRAWING

FIG. 1 is a plan view, with the cover partly broken away, of a dispensing container according to the present invention.

FIG. 2 is a partial longitudinal side edge and partial sectional view as taken on the line 2—2 of FIG. 1.

FIG. 3 is an enlarged perspective view of one end of the container in its first cavity-uncovering position.

FIG. 4 is a similar view of said container in its second cavity-uncovering position.

DESCRIPTION OF THE PREFERRED EMBODIMENT

The receptacle 5, preferably molded of plastic material, integrally comprises a rectangular bottom 15, parallel side walls 16, a longitudinal wall 17 parallel to and preferably equally spaced from the walls 16, and end wall 18, a set of transverse longitudinally spaced walls 19 extending between the side walls 16 and cooperating with the walls 16, 17 and 18 to define the mentioned two rows of cavities 6 and 7, an inner end wall 20 at the end opposite to the end wall 18, an outer end wall 21 spaced from the wall 20, and a top wall 22 spanning between the walls 20 and 21 and having an upper face that is flush with the upper edges of the walls 16, 17, 18 and 19. At the longitudinal corners where the bottom 15 and the side walls 16 meet, are provided longitudinal grooves 23 which extend for the full length of the receptacle. As shown in FIGS. 3 and 4, the cavities 6 and 7 may contain items 24 such as capsules, tablets, pills, etc.

The cover 8 may also be molded of plastic material that is preferably transparent. Said cover comprises a top 25 of rectangular form and size to suit the form and size of the receptacle 5, and side flange walls 26, thus providing the cover with a channel-form to fit over the receptacle with the top covering the cavities 6 and 7 and the flange walls engaging the side walls 16. The longitudinal edges of the flange walls 26 are provided with inwardly directed ribs 27 that engage in the grooves 23 to retain assembly of said receptacle and cover, permitting only endwise displacement of one relative to the other.

The abutment 9 is shown as a rectangular raised portion of the wall 22 and having a rearwardly directed edge 28 that extends for approximately half the transverse extent of said wall 22. While shown as a portion of a width about half that of the transverse size of a cavity 6, the same may comprise a thickened portion substantially less than the extent of abutment 9, as shown. In practice, the thickness of said abutment and that of the cover top 25 are the same, to provide a flush relationship.

The extension 10 of the cover top 25, with the cover in cavity-covering position, forms a complementary transverse extension of the abutment 9, the same defining a recess 29 into which the abutment fits.

It will be clear that when an item 24 in the leftmost cavity 6 is to be exposed, the cover 8 is slid rearward to the position of FIG. 3, thus moving the cover top extension 10 to uncover only part of the aligned cavity 7 at the left. Now, by inverting the container, said item 24 may be dropped into the palm of the hand, into a glass, or into another receptacle. Then, the cover may be slid back to closed position. When another item 24 is desired to be dispensed, the cover 8 is slid rearward to the position of FIG. 4, so the extension 10 is clear of the cavity 7 at the left and the recess-defining portion 30 partly covers the second cavity 6.

In the above manner, the items 24 may be successively and alternately dispensed from the container until the same is emptied.

Due to the transparency of the cover (the receptacle may also be transparent), the number of items remaining in the container may be visually determined.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described the invention, what is claimed and desired to be secured by Letters Patent is:

1. A container for capsules and the like comprising:
    (a) a receptacle having two rows of transversely aligned cavities,
    (b) a slidable cover having a top to cover said cavities,
    (c) an abutment at one end of said receptacle raised above the surface thereof covered by the top of the cover, said abutment having a transverse extent approximating that of the cavities of one row and in general alignment with the latter cavities, and
    (d) an extension on an end edge of said cover in general alignment with the cavities of the other row and partly covering a cavity of said other row that is aligned with a cavity of the first row and which is exposed by said end edge of the cover.

2. A container according to claim 1 in which the container integrally comprises:
    (a) opposite side walls and a wall midway, said walls being parallel, and
    (b) a plurality of uniformly spaced longitudinally spaced transverse walls that extend between the side walls.

3. A container according to claim 1, said cover being manually slidable from its cavity-covering position on the receptacle to fully uncover and partly uncover the cavities of each row, alternately, each fully uncovered cavity in one row being aligned with a partly covered cavity in the other row.

4. A container according to claim 1 in which
    (a) the abutment comprises a raised rectangular portion of the top of the receptacle,
    (b) the top face of said abutment being generally flush with the top face of the cover.

5. A container according to claim 4 in which
    (a) the cover is provided with receptacle-engaging side flange walls,
    (b) a recess being defined between the extension on the end edge of the cover and one of said flange walls,
    (c) said abutment, when the cover is in cavity-covering position, being housed in said recess.

References Cited

UNITED STATES PATENTS

| 1,988,134 | 1/1935 | Nitardy | 206—42 |
| 3,033,355 | 5/1962 | Van Sickle | 206—42 |

FOREIGN PATENTS

| 212,768 | 1/1961 | Austria. |
| 1,095,738 | 12/1960 | Germany. |

JOSEPH R. LECLAIR, *Primary Examiner.*

J. M. CASKIE, *Assistant Examiner.*